United States Patent
Levy et al.

(10) Patent No.: US 10,560,821 B2
(45) Date of Patent: Feb. 11, 2020

(54) ASSOCIATING EXTERNAL DEVICES TO VEHICLES AND USAGE OF SAID ASSOCIATION

(71) Applicant: ANAGOG LTD., Ramot Meir (IL)

(72) Inventors: Gil Levy, Ramot Meir (IL); Yaron Aizenbud, Haifa (IL)

(73) Assignee: ANAGOG LTD., Ramot Meir (IL)

( * ) Notice: Subject to any disclaimer, the term of this patent is extended or adjusted under 35 U.S.C. 154(b) by 110 days.

(21) Appl. No.: 15/676,215

(22) Filed: Aug. 14, 2017

(65) Prior Publication Data
US 2018/0310146 A1    Oct. 25, 2018

Related U.S. Application Data

(63) Continuation of application No. 14/907,775, filed as application No. PCT/IL2014/050674 on Jul. 24, 2014, now Pat. No. 9,801,027.

(60) Provisional application No. 61/858,914, filed on Jul. 26, 2013.

(51) Int. Cl.

| | |
|---|---|
| *H04W 4/40* | (2018.01) |
| *H04W 4/029* | (2018.01) |
| *G08G 1/01* | (2006.01) |
| *G08G 1/123* | (2006.01) |
| *H04W 4/02* | (2018.01) |
| *G06K 9/00* | (2006.01) |
| *H04W 4/80* | (2018.01) |
| *H04W 4/42* | (2018.01) |

(52) U.S. Cl.
CPC .......... *H04W 4/40* (2018.02); *G06K 9/00832* (2013.01); *G08G 1/0112* (2013.01); *G08G 1/123* (2013.01); *H04W 4/027* (2013.01); *H04W 4/029* (2018.02); *H04W 4/42* (2018.02); *H04W 4/80* (2018.02); *G06K 2209/27* (2013.01)

(58) Field of Classification Search
CPC ........... H04W 4/001; H04W 4/02–028; H04W 4/04–046; H04W 48/04
USPC ...................... 455/456.1–457, 11.1
See application file for complete search history.

(56) References Cited

U.S. PATENT DOCUMENTS

| | | | |
|---|---|---|---|
| 2002/0077122 A1 | 6/2002 | Yule | |
| 2003/0013445 A1* | 1/2003 | Fujiwara | ............... H04W 60/00 455/435.1 |
| 2008/0054072 A1 | 3/2008 | Katragadda | |
| 2013/0130686 A1* | 5/2013 | Ikeda | .................... H04W 48/16 455/435.1 |
| 2013/0217414 A1* | 8/2013 | Nagaraj | .............. H04W 84/005 455/456.2 |

(Continued)

*Primary Examiner* — Allahyar Kasraian

(57) ABSTRACT

Methods, apparatuses and products for associating external devices to vehicles and usage of said association. One method obtains information from one or more mobile devices that are connected to the external device. The information is used to determine that the external device is associated with a vehicle, whereby another mobile device is enabled to determine that it is being located on the vehicle based on the mobile device being connected to the external device. Another method obtains an indication that a mobile device is connected to an external device. A database is accessed to retrieve an associated of the external device with a vehicle, whereby it is deduced that the mobile device is located in or on the vehicle. In response to the deduction, a predetermined action may be performed.

12 Claims, 9 Drawing Sheets

(56) References Cited

U.S. PATENT DOCUMENTS

2013/0262223 A1 10/2013 Catane
2015/0010010 A1* 1/2015 Xie .................... H04L 45/04
370/401

* cited by examiner

ASSOCIATING EXTERNAL DEVICES TO VEHICLES AND USAGE OF SAID ASSOCIATION

CROSS-REFERENCE TO RELATED APPLICATION

This application is a continuation of U.S. application Ser. No. 14/907,775 filed Jan. 26, 2016, which is a 371 of PCT/IL2014/050674 filed Jul. 24, 2014, which claims the benefit of U.S. Provisional Application No. 61/858,914 filed Jul. 26, 2013, entitled "Automatic detection of being in a mean of transportation and automatic detection of accessories in a vehicle using mobile device", which is hereby incorporated by reference in its entirety.

TECHNICAL FIELD

The present disclosure relates to mobile devices, in general, and to automatic detection of a mobile device being in a vehicle, in particular.

BACKGROUND

Mobile devices may be able to connect to external devices. The external device may provide additional or alternative input/output components to the mobile device, enable the mobile device to utilize functionality not previously available, or the like. In some exemplary embodiments, connecting to the external device may provide the mobile device with an Internet connection, a broadband connection to a computerized network, or the like. As an example, the external device may be a Bluetooth headset, a speakerphone, an external display, a charger, a Global Positioning System (GPS) receiver, Wi-Fi router, a Wi-Fi hot spot, Radio-frequency identification (RFID) device, Near Field Communication (NFC) device, or the like.

The connection may be a wireless connection, such as using wireless protocols (e.g. Bluetooth, Wi-Fi, RFID, NFC, or the like), or a wired connection using a cable, such as in case of a vehicle charger used to provide power supply to charge the mobile device.

The mobile device may connect to different external devices, to similar external devices and to several external devices at once. Additionally or alternatively, one external device may be connected to a single mobile device at a time, or a plurality of mobile devices simultaneously.

In some exemplary embodiments, a mobile device may be configured to automatically connect to an external device. As an example, in case a Bluetooth device was paired to the mobile device, the mobile device may automatically connect to the Bluetooth device when detecting its presence. As another example, a mobile device may automatically connect to a familiar Wi-Fi network, when the Wi-Fi network is available to the mobile device, such as when the mobile device is within sufficient range of a Wi-Fi router or hot spot that provides access to the Wi-Fi network.

BRIEF SUMMARY

One exemplary embodiment of the disclosed subject matter is a method comprising: obtaining information from a plurality of mobile devices, wherein the information is gathered by sensors of the plurality of mobile devices, while the plurality of the mobile devices are connected to an external device; and determining, based on the information, that the external device is associated with a vehicle, wherein said determining is performed by a processor; whereby enabling a mobile device to determine that the mobile device is located on the vehicle, based on the mobile device being connected to the external device.

Another exemplary embodiment of the disclosed subject matter is a computerized apparatus having a processor, the processor being adapted to perform the steps of: obtaining information from a plurality of mobile devices, wherein the information is gathered by sensors of the plurality of mobile devices, while the plurality of the mobile devices are connected to an external device; and determining, based on the information, that the external device is associated with a vehicle; whereby enabling a mobile device to determine that the mobile device is located on the vehicle, based on the mobile device being connected to the external device.

Yet another exemplary embodiment of the disclosed subject matter is a computer program product comprising a computer readable storage medium retaining program instructions, which program instructions when read by a processor, cause the processor to perform a method comprising: obtaining information from a plurality of mobile devices, wherein the information is gathered by sensors of the plurality of mobile devices, while the plurality of the mobile devices are connected to an external device; and determining, based on the information, that the external device is associated with a vehicle; whereby enabling a mobile device to determine that the mobile device is located on the vehicle, based on the mobile device being connected to the external device.

Yet another exemplary embodiment of the disclosed subject matter is a method comprising: obtaining an indication that a mobile device is connected to an external device; accessing a database to retrieve an association of the external device with a vehicle, wherein the database retains associations between external devices and vehicles, whereby deducing that the mobile device is located in or on the vehicle based on the indication; and in response to deducing that the mobile device is located in or on the vehicle, performing a predetermined action, wherein said performing the predetermined action is performed by a processor.

Yet another exemplary embodiment of the disclosed subject matter is a computerized apparatus having a processor, the processor being adapted to perform the steps of: obtaining an indication that a mobile device is connected to an external device; accessing a database to retrieve an association of the external device with a vehicle, wherein the database retains associations between external devices and vehicles, whereby deducing that the mobile device is located in or on the vehicle based on the indication; and in response to deducing that the mobile device is located in or on the vehicle, performing a predetermined action.

Yet another exemplary embodiment of the disclosed subject matter is a computer program product comprising a computer readable storage medium retaining program instructions, which program instructions when read by a processor, cause the processor to perform a method comprising: obtaining an indication that a mobile device is connected to an external device; accessing a database to retrieve an association of the external device with a vehicle, wherein the database retains associations between external devices and vehicles, whereby deducing that the mobile device is located in or on the vehicle based on the indication; and in response to deducing that the mobile device is located in or on the vehicle, performing a predetermined action.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
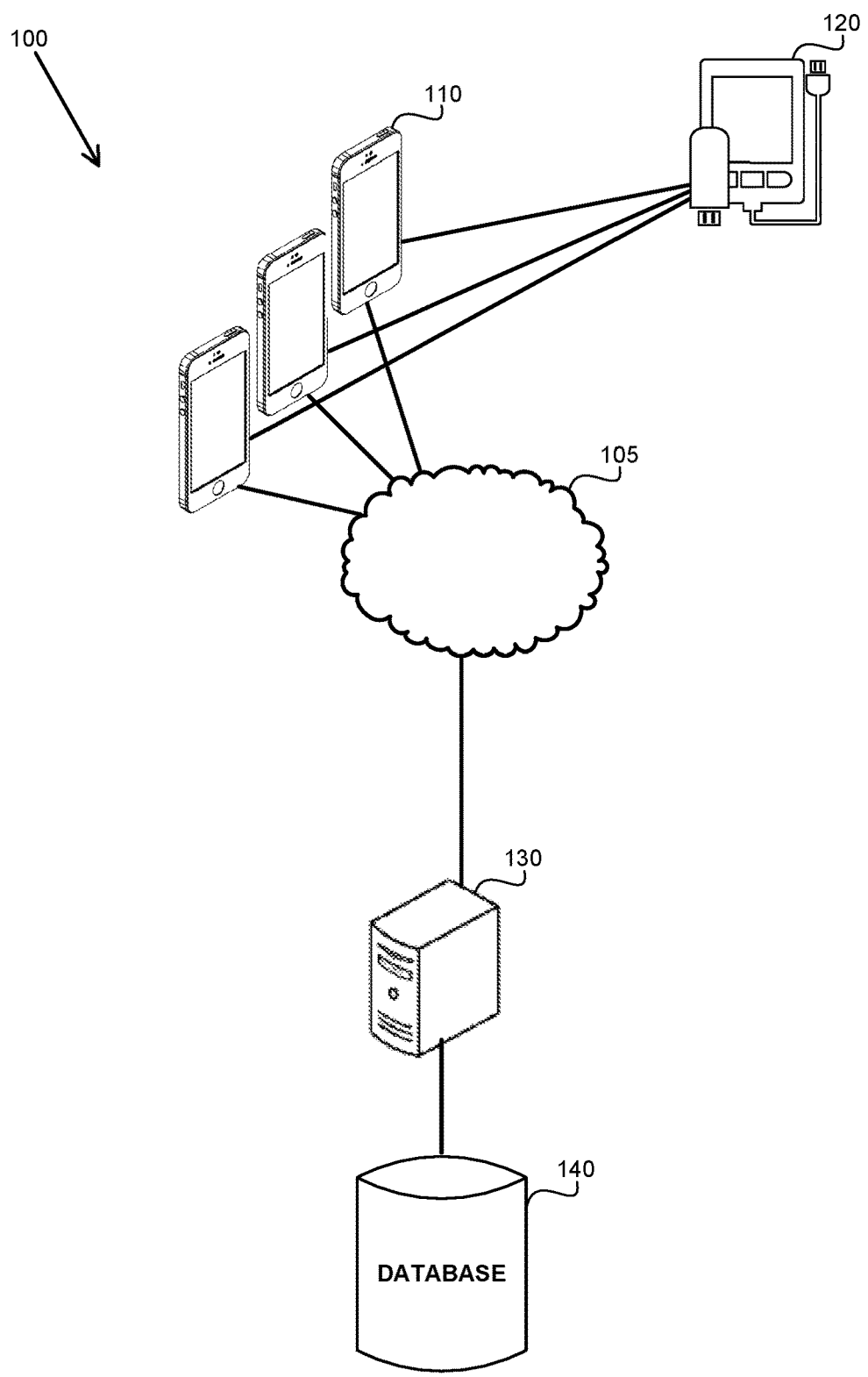
FIG. 1 shows an illustration of a computerized environment, in accordance with some exemplary embodiments of the disclosed subject matter.

One technical problem dealt with by the disclosed subject matter is to enable a determination that a mobile device is located on a vehicle. In some cases, the vehicle may be a public vehicle.

The mobile device may be a handheld computing device, a mobile phone, a smartphone, a cellular phone, a laptop computer, a tablet computer, a Personal Digital Assistant (PDA), smartwatch, wearable accessories, or the like.

In the present disclosure, the term "vehicle" may relate to any means of transportation including but not limited to a car, a bike, a train, a subway, a bus, a ship, an airplane, or the like.

In the present disclosure, the term "public vehicle" may relate to any vehicle that can be used by many different people at the same time or at different times, such as for example, a bus, a train, a subway, an airplane, or the like.

Another technical problem dealt with by the disclosed subject matter is to identify that a user of a mobile device is on or in a vehicle.

Yet another technical problem dealt with by the disclosed subject matter is to filter information gathered from a plurality of mobile devices. Filtering the information may be based on the plurality of mobile devices being associated with one or more vehicles. In some exemplary embodiments, filtering the information may be performed to remove information gathered from mobile devices located on vehicles (or types thereof), public vehicles, or the like. Additionally or alternatively, the information may be filtered to allow processing only of information gathered from mobile devices that are located on vehicles, public vehicles, specific vehicles, or the like.

One technical solution may be to identify that the mobile device is connected to an external device and to determine that the mobile device is located in or on a vehicle based on a predetermined association between the external device and the vehicle. In some cases, the association between the external device and the vehicle may be determined automatically based on information from a plurality of mobile devices, which is gathered while the plurality of mobile devices are connected to the external device.

In the form of a non-limiting example, the external device may be a Bluetooth headset, a speakerphone, an external display, a charger, a GPS Receiver, an RFID device, an NFC device, a Wi-Fi router, a Wi-Fi hot spot, car computer, vehicle telematics system, or the like.

In some exemplary embodiments, after an association between an external device and a vehicle is determined, a database is updated to retain the association for future usages. The database may be used when a mobile device is detected as connected to an external device to infer that the mobile device is located in or on the same vehicle to which the external device is associated. In some exemplary embodiments, the mobile device may be configured to access the database to determine that the mobile device is located in or on the vehicle to which the external device is associated. Additionally or alternatively, a server may access the database to determine that the mobile device is located in or on the vehicle to which the external device is associated.

Another technical solution may be to determine that the external device is associated with a vehicle based on physical data that is gathered by mobile devices while the mobile devices are connected to the external device. In some cases, each mobile device may gather physical data over time while being connected to the external device. A correlation between the physical data obtained from different mobile devices while being connected to the same external device at overlapping times may be indicative that the external device is located in or on a vehicle. For example, the information may indicate a similar change in position, orientation, mobility status, acceleration, or the like, thereby indicating that the mobile devices are located in or on a same vehicle. In some exemplary embodiments, a correlation may be indicative that the external device is not stationary, such as indication that the location changes in over a predetermined distance (e.g., 500 meters, 1 km, or the like), an indication of a speed above a predetermined threshold (e.g., over 5 km/h, 20 km/h, or the like), or the like. In addition, in case the information is gathered from a number of mobile devices greater than a predetermined threshold, it may be determined that the vehicle is a public vehicle. For example, the threshold may be two mobile devices, three mobile devices, ten mobile devices, or the like. It will be noted that in a public vehicle several users holding several mobile devices may ride together, while such a situation is less likely in a non-public vehicle, such as a bike or a private car.

Yet another technical solution may be to obtain a positional data of one mobile device in various points in time. Determining that the external device is associated with a public vehicle may be based on identifying a correlation over time between the positional data of the one mobile device and a path of the public vehicle. The path may be obtained from a database. The path may be a predetermined and substantially consistent route of the public vehicle or portion thereof such as a route defined by a railroad, a defined route of a bus, a set of checkpoints along the route, such as bus stations, streets, or the like.

Yet another technical solution may be to obtain a speed of one mobile device in various points in time. Determining that the external device is associated with the public vehicle may be based on determining that the speed of the one mobile device is greater than a predefined speed threshold. The predefined speed threshold may be associated with a speed of the public vehicle, such as a speed of over 200 km/h which is expected from certain trains but not private vehicles.

Yet another technical solution may be to obtain a positional data of one mobile device in various points in time. Determining that the external device is associated with the public vehicle may be based on determining a movement pattern based on the positional data in the various points in time. The movement pattern may be associated with the mobile device being located in or on the public vehicle.

Yet another technical solution may be to obtain information that may be indicative of a position and speed of one mobile device in various points in time, and obtaining traffic information pertaining to the position of the one mobile device in the various points in time. Determining that the external device is associated with the public vehicle may be based on identifying a contradiction between the traffic information and the speed of the one mobile device.

Yet another technical solution may be to obtain user interaction information. The user interaction information may indicate interactions by a user with the mobile device. Determining that the external device is associated with the public vehicle may be based on identifying that the user interaction information is indicative of the user being on or in the vehicle. The user interaction may be, for example, a pattern of interaction (e.g., gaps between user interactions or lack thereof), a type of user input method used (e.g., voice commands, using keyboard, using pointing device, etc.), type of activities (e.g., usage of browser, usage of music player, usage of GPS navigation application, turning on or off an airplane mode, or the like). In some exemplary embodiments, machine learning techniques may be used to identify that the user interaction is indicative of the user being on or in the vehicle. As an example, a trained classifier may be used to predict whether or not the user interaction is indicative of the user being on or in the vehicle.

In some cases, the trained data may include user interaction information that is obtained from one or more mobile devices while their association to a vehicle (or lack thereof) is known or determined. The user interaction information may be information obtained from a plurality of mobile devices regardless of the users, personalized information obtained from mobile devices operated by similar users to the user, or information obtained from mobile devices operated by the user herself.

Yet another technical solution may be to obtain mobility information of the one or more mobile devices at various points in time. The mobility information may indicate a mobility status, such as a "driving" status, a "non-driving" status, a "walking" status, or the like. The mobility information may be determined based on sensors of the mobile device, such as but not limited to accelerometer readings. Based on the mobility status, a portion of the driving time out of the total connection time to the external device may be calculated. The calculated portion may be used to determining that the external device is associated with a vehicle. As an example, in case the portion is greater than a predefined threshold, such as 50%, 60%, 70%, or the like, the external device may be deduced to be located on a vehicle.

One technical effect of the disclosed subject matter may be to crowd source mobile devices to determine, without prior knowledge, associations between external devices and vehicles. In some cases, by crowd sourcing a continuously monitoring the received information, changes, such as deploying new external devices, moving an external device from one vehicle to another or to a non-vehicle and vise versa, or the like, may be detected automatically.

Another technical effect may be enabling filtering of crowd sourced information based on location of the mobile device in vehicles or public vehicles. As an example, traffic information may be deduced based on crowd sourced information. However, information obtained from certain vehicles, such as bus driving in a bus lane, bikes, trains, or the like, may not be useful for such computations and may even be counterproductive as it may indicate there are no traffic jams in locations where there are traffic jams. The disclosed subject matter may be used to filter such information even if it is provided by certain mobile devices. As another example, crowd sourced information from all users which is filtered to relate solely to users riding public vehicles, may be used to track the public vehicles over time without deploying devices on the public vehicles and without cooperation of the service provider of the public vehicle.

In some exemplary embodiments, the crowd sourced information may be obtained from all types of mobile devices and at all times, and may be filtered according to a desired filtering condition and according to a current state of the mobile device at each point in time.

Yet another technical effect may be enabling functionality manipulation, when the mobile device is located on or in a vehicle or a public vehicle. The manipulation may be a modification to a User Interface (UI) of the mobile device, based on the mobile device being located on or in the vehicle. As another example, the manipulation may be an activation of predetermined functionalities, such as logging the user on to a predetermined service (e.g., a social network service).

In some exemplary embodiments, an estimated destination of a user of the mobile device may be determined. As an example, a specific line number of the public vehicle may be determined and based thereof potential destinations may be determined. In some cases, user history and history of other users may also be used to predict the destination. Accordingly, content items that are associated with the estimated destination may be served to the mobile device to be provided to the user. The content items may be, for example, destination-based advertisements, information about the destination, alerts or notifications related to the destination, or the like. Additionally or alternatively, an estimated arrival time of the vehicle to the estimated destination may be indicated. In this case, a notification of being late may be issued, or an alarm may be activated close to the estimated arrival time, or the like.

Referring now to FIG. 1 showing an illustration of a computerized environment, in accordance with some exemplary embodiments of the disclosed subject matter.

Computerized Environment 100 comprises a Server 130 connected to a Network 105, such as a Local Area Network (LAN), Wide Area Network (WAN), intranet, the Internet, or the like. Server 130 may be a processing device. Server 130 may be configured to obtain and process information from external sources, such as but not limited to mobile devices (e.g., Mobile Device 110).

Mobile Device 110, such as a mobile phone, a PDA, a tablet, or the like, may send information to Server 130 via Network 105. In some cases, Mobile Devices 110 may be a handheld device or otherwise carried by a user. In some exemplary embodiments, Mobile Device 110 may gather information by sensors. A sensor of Mobile Device 110 may be a device measuring any physical property, such as for example, an accelerometer, a gyroscope, a compass, a barometer, a photosensor, sound sensor (e.g., microphone), or the like.

In some exemplary embodiments, the information may comprise physical data measured by Mobile Device 110 using sensors. The physical data may comprise, for example, a location of Mobile Device 110 at various points in time, a speed of Mobile Device 110 at various points in time, a direction of Mobile Device 110 at various points in time, an acceleration of Mobile Device 110 at various points in time, an altitude of Mobile Device 110 at various points in time, a light measurement measured by photosensors of Mobile Device 110 at various points in time; and a sound measurement measured by microphones of Mobile Device 110 at various points in time, or the like.

In some exemplary embodiments, the information may comprise positional information of Mobile Device 110, such as a location of Mobile Device 110. Mobile Device 110 may detect the location by using a positioning device that is capable of ascertaining its position, such as, for example, a GPS receiver, a Wi-Fi based triangulator, a cell-based triangulator, or the like. In some exemplary embodiments, Mobile Device 110 may obtain sensor readings useful for determining a mobility status of Mobile Device 110. "Mobility status" may be a status indicating a mode of movement of Mobile Device 110 or user holding Mobile Device 110. The mobility status may indicate a "driving" status (e.g., Mobile Device 110 is located within a vehicle that is being driven), a "walking" status (e.g., Mobile Device 110 is held by a person that is walking), a "non-driving" status (e.g., Mobile Device 110 is not located within a vehicle being driven), or the like. In some cases, the mobility status may be identified by readings of an accelerometer of Mobile Device 110 and identification of an acceleration curve that is indicative of the mobility status. However, the disclosed subject matter is not limited to such an embodiment, and other sensors may be utilized, such as, for example, a positioning device, in order to determine the mobility status of Mobile Device 110.

In some exemplary embodiments, Mobile Device 110 may monitor user interaction by the person using Mobile Device 110, also referred to as a user (not shown). User interaction may include any form of interaction of the user with Mobile Device 110 including but not limited to usage of specific applications, I/O components used to interact with Mobile Device 110, functionalities that are operated by the user, a rate of user interaction and timing thereof, a selected mode of operation of Mobile Device 110 (e.g., "flight" mode), or the like.

In some exemplary embodiments, Mobile Device 110 may be connected to an External Device 120. External Device 120 may be a power charger, a Bluetooth device, a Bluetooth headset, a speakerphone, an external display, a GPS receiver, an RFID device, an NFC Device, a Wi-Fi router or hot spot, or the like.

In some exemplary embodiments, the connection between Mobile Device 110 and External Device 120 may be a wireless connection, such as using wireless protocols (e.g. Bluetooth, Wi-Fi, RFID, NFC, or the like), or a wired connection using a cable, such as in case of a vehicle charger used to provide power supply to charge the Mobile Device 110. In some exemplary embodiments, Mobile Device 110 may be connected to several external devices at the same time. In some exemplary embodiments, External Device 120 may be connected to more than a single mobile device at the same time.

In some exemplary embodiments, Server 130 is configured to determine, based on the information provided by Mobile Device 110, that External Device 120 is associated with a vehicle. In some exemplary embodiments, the determination may identify that the vehicle is a public vehicle. Additionally or alternatively, the determination may identify the type of the vehicle (e.g., a bus, a bike, a train, a car, or the like), the identity of the vehicle such as a line number or train number.

In some exemplary embodiments, Server 130 may be configured to store the association between External Device 120 and the vehicle in a Database 140. Database 140 may be utilized by devices to determine that a mobile device, which is connected to External Device 120, is located on the vehicle associated with External Device 120. In some exemplary embodiments, the determination may be by a mobile device, such as Mobile Device 110, which may access Database 140. Additionally or alternatively, the determination may be by Server 130, by another server, or by another computing device.

It will be noted that Computerized Environment 100 is illustrated with three mobile devices and a single external device. However, the disclosed subject matter is not limited to such an arrangement and any number of mobile devices and external devices may be part of a computerized environment according to the disclosed subject matter.

Figure 2:
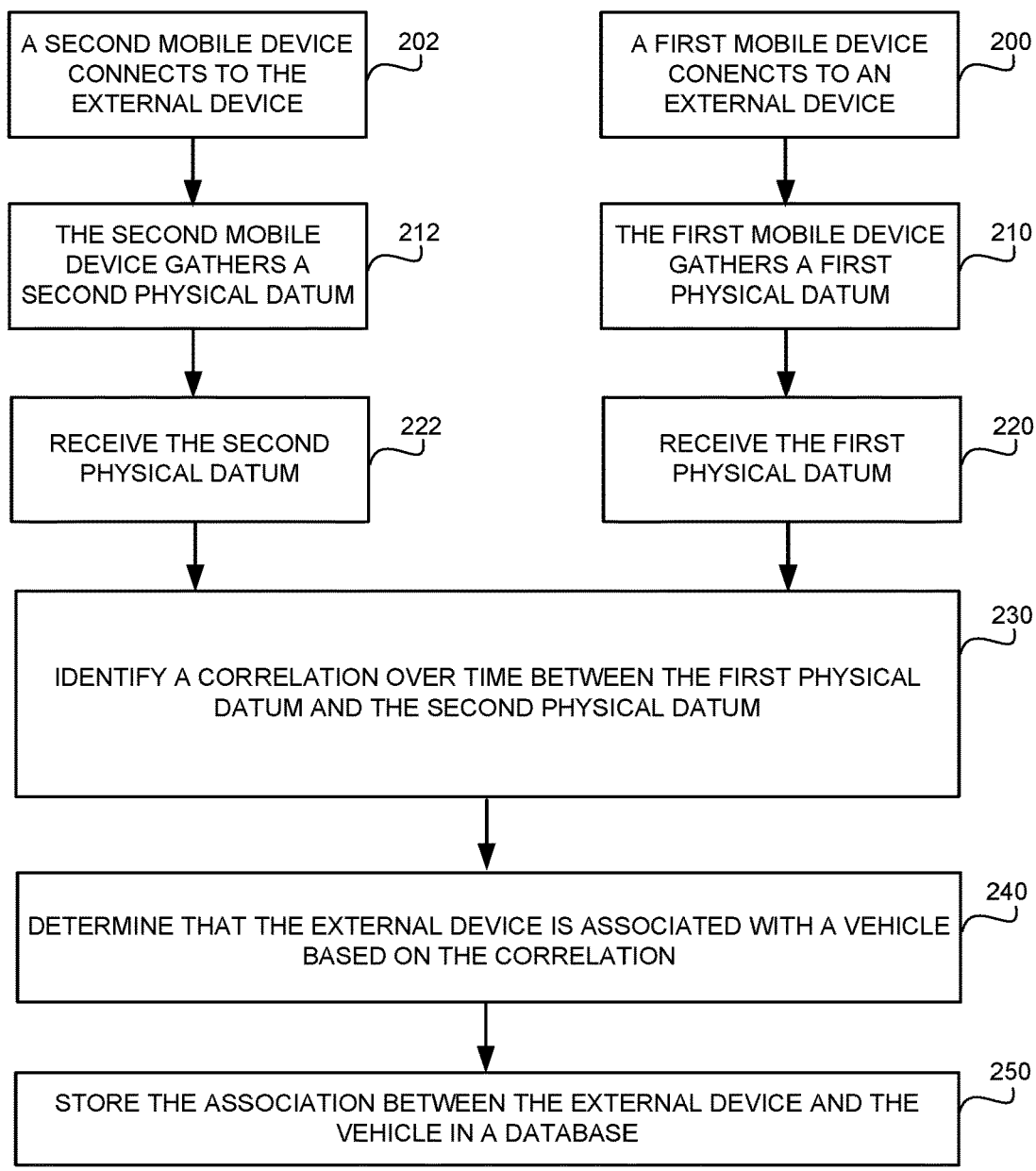
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter. The method depicted in FIG. 2 may be performed by a server, such as 130 of FIG. 1.

In Step 200, a first mobile device may connect to an external device, such as 120 of FIG. 1. Similarly, in Step 202, a second mobile device may connect to the external device. The connections may occur at different times. In some cases, the mobile devices may be connected to the external device at overlapping times, simultaneously, or the like.

In Step 210, the first mobile device may gather a first physical datum. The first physical datum may be gathered by a sensor of the first mobile device. In Step 212, the second mobile device may gather a second physical datum. The physical data may be gathered by the mobile devices over time, such as periodically, every ten milliseconds, every one second, every one minute, every fifteen minutes, or the like. For example, the mobile devices may use a positioning device to determine a location of the mobile devices over time. Additionally or alternatively, the mobile devices may use an accelerometer to determine an acceleration measurement of the mobile devices over time.

In Steps 220 and 222, the physical data may be received, such as by a server. The server may receive the physical data from the mobile devices, such as via Network 105 of FIG. 1. In some exemplary embodiments, the mobile devices may transmit the physical data to the server periodically, immediately after obtaining each physical datum, or the like.

In some exemplary embodiments, a physical datum may comprise information relating to at least one physical measured property at a point in time. In some exemplary embodiments, the physical datum may comprise at least one of: a location of a mobile device at a point in time, a speed of a mobile device at a point in time, a direction of a mobile device at a point in time, an acceleration of a mobile device at a point in time, an altitude of a mobile device at a point in time, a light measurement measured by a photodetector at a point in time, a sound measurement measured by a microphone at a point in time, or the like.

In step 230, a correlation over time between the physical data of the first mobile device and the physical data of the second mobile device may be determined. The correlation may relate to overlapping times in which the mobile devices are connected to the external device and obtain physical data.

In some exemplary embodiments, in case of physical data indicates measured speeds at various points in time, the correlation may be determined if the physical data sets have substantially the same speed over time. It will be noted that in some cases, the measurements may not be identical and still be considered as having a correlation, such as in case of using different sensors with different sensitivities or potential offsets, taking measurements at different times (e.g., within 10 seconds of each other), failing to obtain correct measurements by the sensors temporarily, or the like.

As another example, correlation between locations of the mobile devices at different times may indicate that the mobile devices are moving substantially together over time, such as would be the case if the mobile devices are carried by users riding the same vehicle.

As yet another example, a correlation between deltas of the measurements may be determined. Such a correlation may allow determining that the users are located on the same vehicle even if they are not near one another. Additionally or alternatively, the correlation may be a correlation of trends of the physical data of the different mobile devices.

Additionally or alternatively, the correlation may be indicative that the location of the external device is not stationary, such as the mobile devices are located in different locations when connected to the external device, a speed and acceleration measurements associated with being driven, mobility status of at least some of the mobile devices are indicative of being driven while connected to the external device at least a portion of the time, or the like.

In some exemplary embodiments, the correlation may be a correlation between tuples of physical measurements. Each mobile device may provide, for each point in time, a tuple of measurements of physical properties. Each element in the tuple may indicate a measurement of a different physical property or by a different sensor. The determined correlation may be correlation between the tuples over time. For example, the tuple may include three measurements: a first element measuring altitude, a second element measuring light, and a third measurement measuring acceleration. A correlation between the two or more sets of tuples, obtained from two or more mobile devices, may be determined. It will be noted that light measurements may be useful in subways and trains which are intermittently exposed to daylight. It will be further noted, that altitude may be useful in terrains which have slopes, hills, planes and similar varying terrain types.

In Step 240, the external device may be determined to be associated with a vehicle.

Identifying that mobile devices are connected together to a same external device record similar physical measurements or changes thereof, may indicate that the users are located in a same vehicle. In case the physical measurements are indicative of changing location, changing speed, being in a "driving" status, or the like, they may indicate that the external device is located in a vehicle. Referring to the above mentioned example, a correlation between the speed of the first mobile device and the speed of the second mobile device may indicate that the first mobile device and the second mobile device are moving at the same pattern over time and thus are located in or on the same vehicle.

In some exemplary embodiments, in case the correlation is between physical data recorded by a group of mobile devices that comprise more than a minimal threshold of devices, it may be determined that the external device is associated with a public vehicle. As an example, the minimal threshold may be two mobile devices, three mobile devices, ten mobile devices, twenty mobile devices, a hundred mobile devices, or the like. It will be noted that in some cases, different sets of mobile devices may be simultaneously connected to the external device at different times thereby indicating that the external device is publicly accessible, such as a hot spot in a public vehicle, and not private such as a hot spot in a non-public vehicle.

In Step 250, the association between the external device and the vehicle may be stored in a database, such as 140 of FIG. 1. The database may be updated to include a record containing at least two elements: an identifier of the external device, such as Service set identification (SSID), a Media Access Control (MAC) address, Bluetooth address, Internet Protocol (IP) address, or the like, and the associated type of vehicle (e.g., none/public/non-public). Additionally or alternatively, the record may contain an element identifying the specific vehicle, such as a line number of a bus.

In some exemplary embodiments, the database may retain the obtained physical data to allow for future processing of the physical data, such as re-evaluating the determination of Step 240 in the future in view of additional recorded information. In some cases, an external device may be removed from a vehicle and may be deployed elsewhere. The same may also apply to external devices that are initially not deployed in a vehicle and later on are so deployed. As an example, consider a Bluetooth headset that is initially used by a user when walking and driving, and is later on solely used when driving. In some cases, the initial determination may be modified based on new information while potentially still addressing the information that led to the initial determination.

Figure 3:
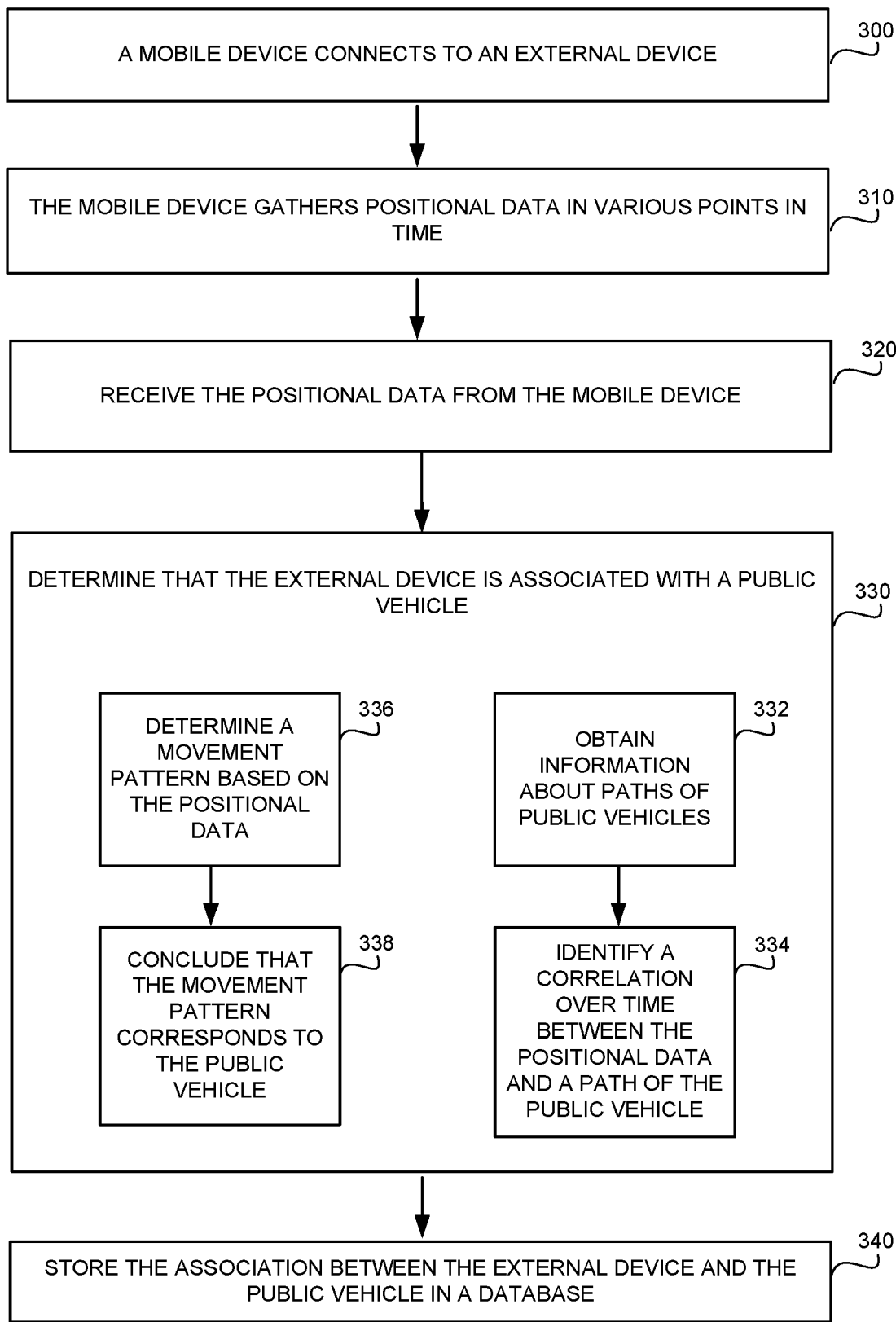
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. The method of FIG. 3 may be performed by a server, such as 130 of FIG. 1.

In Step 300, a mobile device may connect to an external device, in a similar manner to Step 200 of FIG. 2.

In Step 310, the mobile device may gather positional data in various points in time. In some exemplary embodiments, the positional data may be gathered by sensors of the mobile device, measuring a physical location of the mobile device, such as, for example, a GPS receiver, Wi-Fi receivers, or the like. In some exemplary embodiments, the positional data may be an outcome of triangulation computations. In some exemplary embodiments, the positional data may include locations of the mobile device in various points in time, such as depicted by a longitude and latitude information. Additionally or alternatively, the positional data may include altitude, orientation, direction, or the like. The positional data may be gathered by the mobile device over time, such as periodically, every ten milliseconds, every one second, every one minute, every fifteen minutes, or the like. For example, the mobile device may use a positioning device to determine positions of the mobile device over time.

In Step 320, the positional data may be received from the mobile device, such as by a server. In some exemplary embodiments, the mobile device may transmit the positional data to the server periodically, immediately after obtaining each positional datum, or the like.

In Step 330, a determination that the external device to which the mobile device is connected is associated with a public vehicle may be performed. In some exemplary embodiments, the determination may be performed using Steps 332 and 334, using Steps 336 and 338, or in a similar manner.

In Step 332, information about paths of public vehicles may be received. The information may include predetermined routes of public vehicles, such as for example, a route of a specific bus line, a defined route of a train, an outline of a track or railroad, a set of stations of a line of a bus, a time table of a public means of transportation, or the like.

The information about the paths of the public vehicles may be obtained from a database. The database may or may not be provided by a third party, such as but not limited to providers of public transportation services.

In Step 334, a correlation over time between the positional data and a path of a public vehicle may be identified. In some exemplary embodiments, the correlation may be identified as a compatibility between the positional data and the information about the paths over time, as an example compatibility between locations of the mobile device in various points in time and a route of a bus. The compatibility in this case may indicate that while the mobile device was connected to the external device, the mobile device was located on or in the bus. In some exemplary embodiments, the correlation may be a correspondence between the positional data and a path that is designated for a specific line of public transportation.

In some exemplary embodiments, based on the correlation with a path, an association to a specific type of public vehicle, such as a train, a bus, or the like, may be determined. Additionally or alternatively, the determined association may be with a specific line, such as a specific train line, a specific bus line, or the like.

It will be noted that the correlation may not be exact. In some cases, only a portion of the positional data may match the path. For example, a bus driver may drive the bus to additional locations while being off-duty. As another example, a detour may be taken by a train or a bus in view of temporary conditions. In some cases, if the positional data correlates o the path in over a predetermined portion of the data, such as over 50%, over 80%, over 90%, or the like, the association with the path, and accordingly with the specific public vehicle, may be determined.

In Step 336, a movement pattern may be determined based on the positional data. The movement pattern may be determined based on the positional data of the mobile device in various points in time. In some exemplary embodiments, sensors of the mobile device may be utilized to detect a movement pattern of the mobile device over time. For example, the movement pattern may be determined based on information gathered by GPS sensors, location indication sensors of the mobile device, or the like. In some exemplary embodiments, the movement pattern may be a pattern of mobility statuses over time. The movement pattern may be a pattern of gaps between driving and stopping (e.g., driving two minutes, stopping for one minute, driving for three minutes, stopping for one minute, etc.), pattern of speeds over time (e.g., between 10-20 km/h for ten minutes, between 0-5 km/h for one minute, between 10-20 km/h for one minute, between 20-30 km/h for two minutes, etc.), or the like.

In Step 338, the server may conclude that the movement pattern corresponds to a public vehicle. Different types of vehicles may have different behaviors and different movement patterns. For example, a movement pattern of repetition of driving then stopping for few seconds, may correspond to a public vehicle. If the stopping parts in the movement pattern are close to each other, for example less than few hundreds of meters, the movement pattern may indicate being on a bus. If the stopping parts in the movement pattern are far from each other, for example more than five, ten or twenty kilometers, the movement pattern may indicate being on a train. If the duration between stops is relatively short, it may be determined that the movement pattern is consistent with a vehicle in traffic jams.

In Step 340, the association between the external device and the public vehicle may be stored in a database, in a similar manner to Step 240 of FIG. 2.

Figure 4:
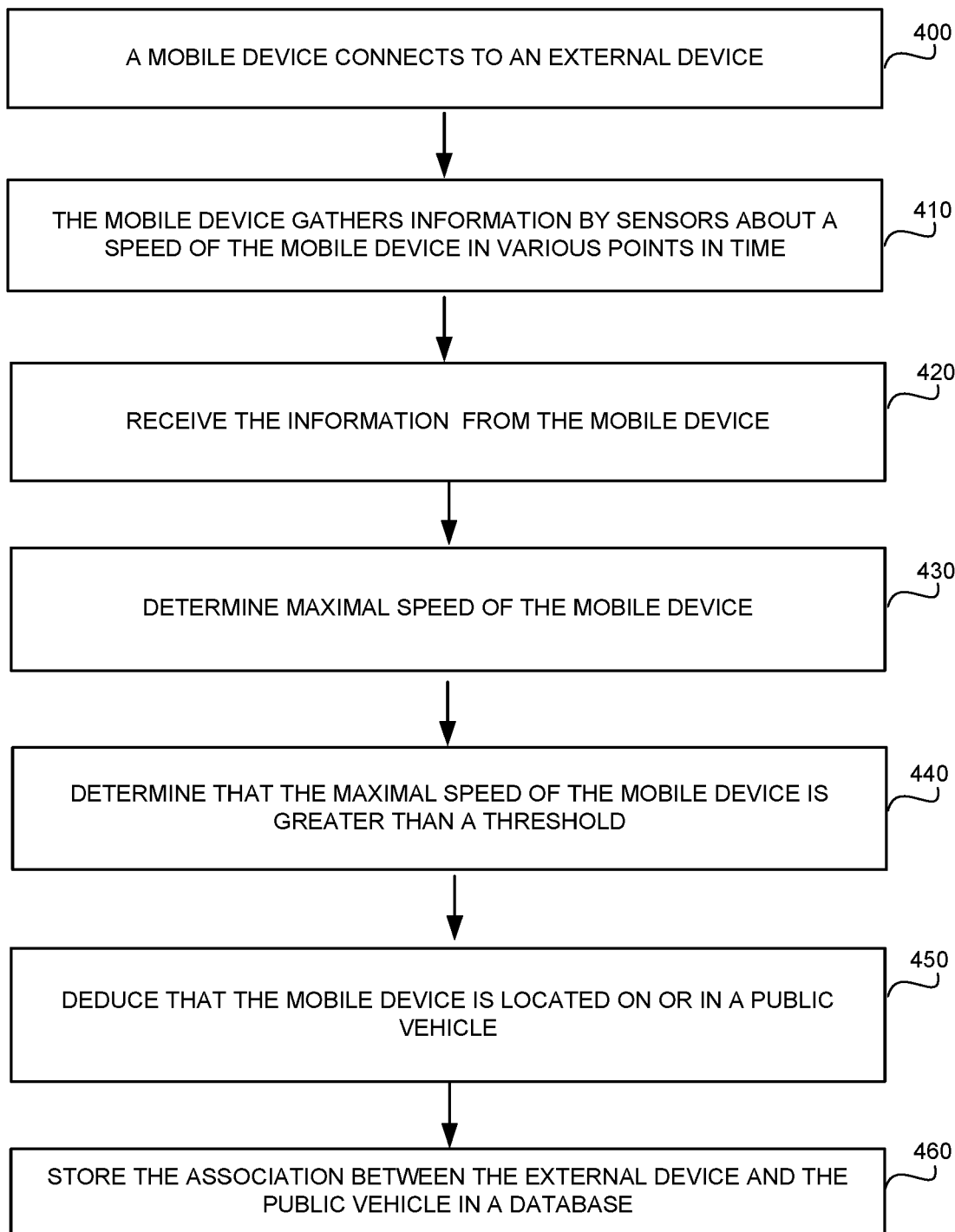
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter. The method of FIG. 4 may be performed by a server, such as 130 of FIG. 1.

In Step 400, a mobile device may connect to an external device, in a similar manner to Step 200 of FIG. 2.

In Step 410, the mobile device may gather information about a speed of the mobile device in various points in time. The information may be gathered by the mobile device over time, such as periodically, every ten milliseconds, every one second, every one minute, every fifteen minutes, or the like.

In Step 420, the information may be received from the mobile device, in a similar manner to Step 320 of FIG. 3.

In Step 430, a maximal speed of the mobile device may be determined. The maximal speed of the mobile device may be the maximal measured speed of the mobile device according to the received information.

In Step 440, the maximal speed may be compared with a threshold to determine that the maximal speed is greater than the threshold. Additionally or alternatively, different ranges may be used, each indicative of a potentially different type of public vehicle. Different thresholds may be indicative of different kinds of public vehicles. For example, a threshold of 160 km/hour may be indicative of a train. A range of 40 km/h to 80 km/h may be indicate a bus.

In Step 450, the mobile device may be deduced to be located on or in a public vehicle, based on the determination of Step 440. In some exemplary embodiments, a type of public vehicle may be determined based on the above-mentioned information or based on additional information in accordance with the disclosed subject matter.

In Step 460, the association between the external device and the public vehicle may be stored in a database, in a similar manner to Step 240 of FIG. 2.

Figure 5:
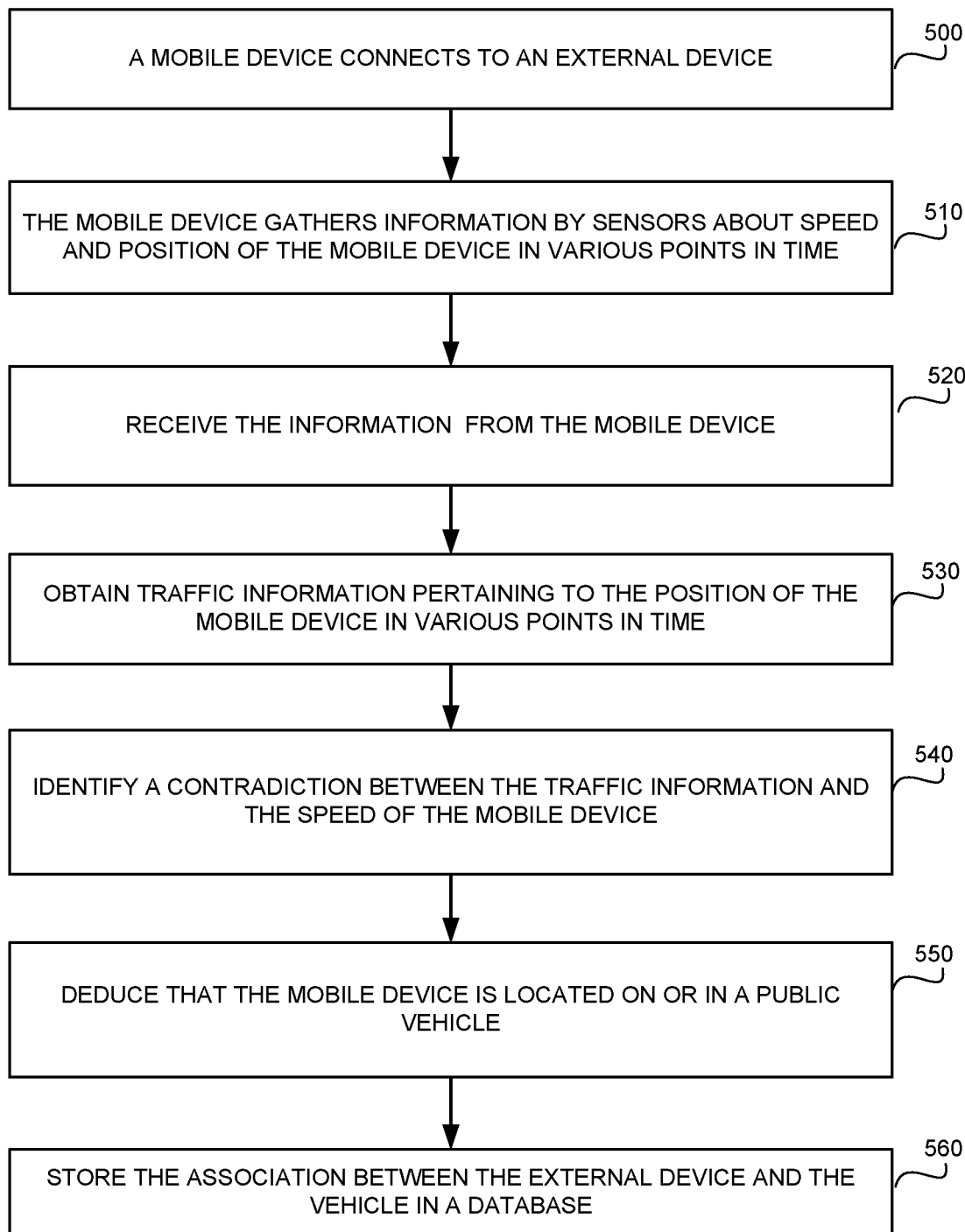
FIG. 5 shows a flowchart diagram of a method, in accordance with some exemplary embodiments of the disclosed subject matter.

Referring now to FIG. 5 showing a flowchart diagram of a method, in accordance with some exemplary embodiments of the disclosed subject matter. The method of FIG. 5 may be performed by a server, such as 130 of FIG. 1.

In Step 500, a mobile device may connect to an external device, in a similar manner to Step 200 of FIG. 2.

In Step 510, the mobile device may gather information about a speed and position of the mobile device in various points in time. The information may be gathered by sensors of the mobile device, such as in Step 410 of FIG. 4 and Step 310 of FIG. 3.

In Step 520, the information may be received from the mobile device, in a similar manner to Step 320 of FIG. 3.

In Step 530, traffic information pertaining to the position of the mobile device in various points in time may be obtained. The information may be obtained from a third party server collecting traffic information, from a database retaining traffic information, or the like. Traffic information may indicate traffic jams, average driving speeds in roads, or the like.

In Step 540, a contradiction between the traffic information and the speed of the mobile device may be identified. In some exemplary embodiments, the contradiction may be, for example, speed higher than average speed by a predetermined threshold (e.g., 20%, 20 km/h, or the like), high speed in a traffic jam, or the like. Such contradictions may be indicative, for example, that the vehicle uses dedicated road or railroad which may not be affected by traffic as private vehicles. In some exemplary embodiments, not being affected from traffic may indicate being on a train or being in a bus that is using a bus lane. Additionally or alternatively, a bike may also not be affected by traffic.

In Step 550, it may be deduced that the mobile device is located on or in a public vehicle.

In Step 560, the association between the external device and the public vehicle may be stored in a database, such as in Step 240 of FIG. 2.

Figure 6A:
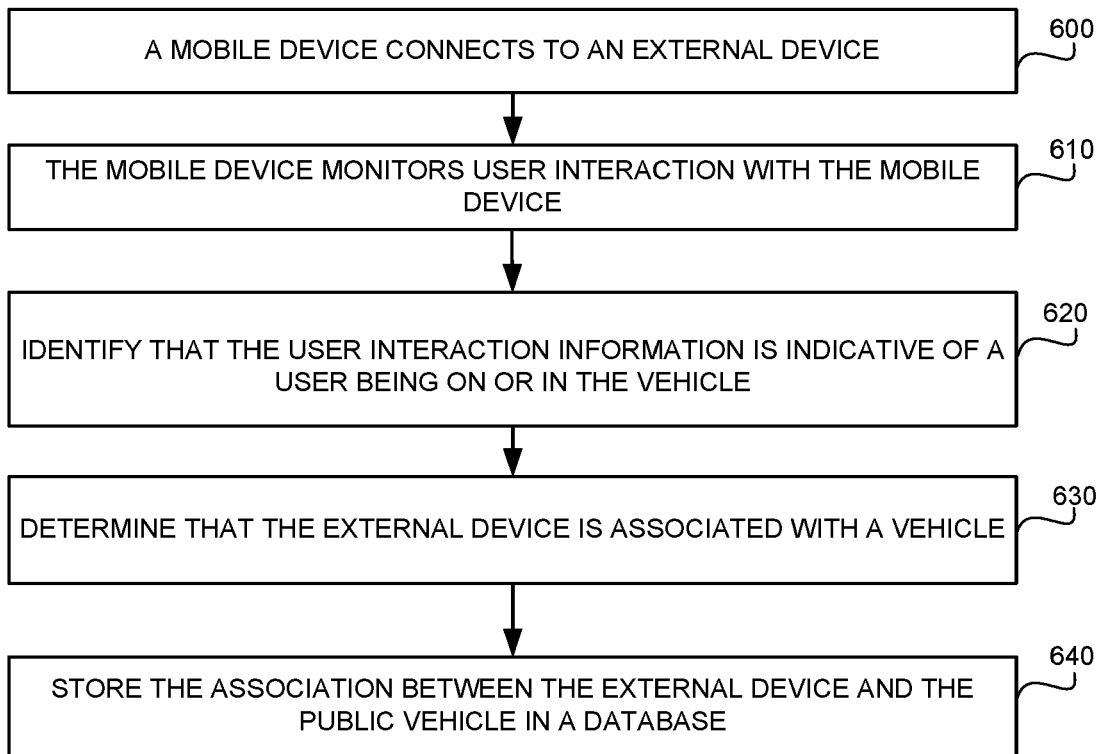
FIG. 6A shows a flowchart diagram of a method, in accordance with some exemplary embodiments of the disclosed subject matter.

Referring now to FIG. 6A showing a flowchart diagram of a method, in accordance with some exemplary embodiments of the disclosed subject matter. The method of FIG. 6A may be performed by a server, such as 130 of FIG. 1. Additionally or alternatively, the method of FIG. 6A may be performed by a mobile device, such as 110 of FIG. 1.

In Step 600, a mobile device may connect to an external device, in a similar manner to Step 200 of FIG. 2.

In Step 610, the interaction of the user with the mobile device may be monitored. The user interaction may be monitored for a duration of time, such as 10 minutes, 20 minutes, an hour, or the like. The monitored user interaction may include the method of operation which the user selects for the mobile device, applications or features of the mobile device that the user enables, bandwidth utilization, type of I/O devices used to interact with the mobile device, a rate of interaction of the user with the mobile device, or the like. The user interaction information may be utilized by the mobile device itself or may be transmitted to another component, such as a server, to be processed and used by the other component.

In Step 620, it may be determined that the user interaction information is indicative of a user being on or in a vehicle. Additionally or alternatively, user interaction information may be determined to be indicative of the user being in or on a public vehicle. In some exemplary embodiments, the determination may be performed using a machine learning tool, also referred to as a classifier. The classifier may be configured to predict, based on user interaction information, whether the user is in a vehicle, in a public vehicle, not in a vehicle, or the like. In some exemplary embodiments, the classifier may predict a specific vehicle being used, such as a bus line, based on the user interaction. As an example, when riding on a train to Paris, the user may interact with the mobile device and obtain information relevant to Paris. As a result, it may be determined that the user rides a train to Paris. In some exemplary embodiments, the classifier may be trained using training data, as is depicted in FIG. 6B.

In Step 630, based on the determination of Step 620 and in view of the connection in Step 610, it may be determined that the external device is associated with a vehicle, a public vehicle, or the like.

In Step 640, the association between the external device and the vehicle may be stored in a database, in a similar manner to Step 240 of FIG. 2.

Figure 6B:
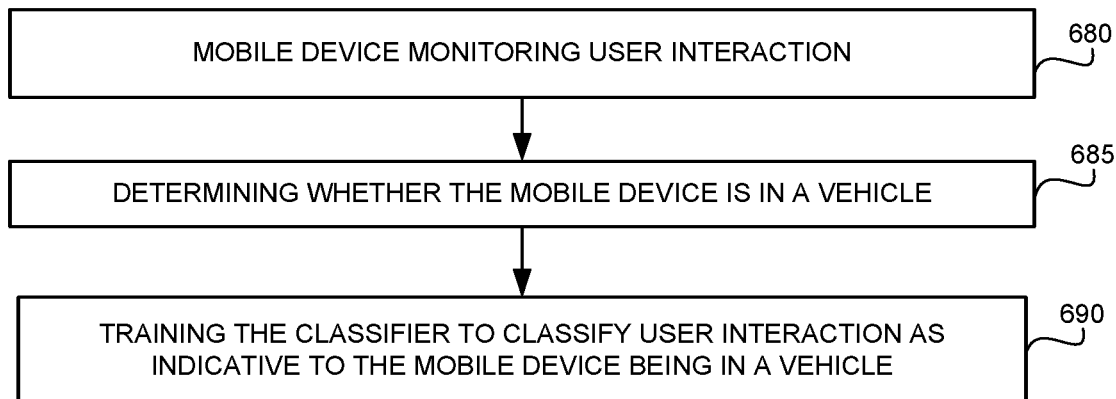
FIG. 6B shows a flowchart diagram of a method, in accordance with some exemplary embodiments of the disclosed subject matter.

Referring now to FIG. 6B showing a flowchart diagram of a method, in accordance with some exemplary embodiments of the disclosed subject matter.

User interaction information is obtained, such as by having the mobile device monitor the user interaction (Step 680). In addition and separately from the user interaction information, it may be determined whether or not the user is in a vehicle, a public vehicle, a specific vehicle or the like (Step 685). The determination may be denoted as a label (L). As an example, the determination may be based on the mobile device being connected to an external device that is associated with a vehicle. Additionally or alternatively, the determination may be based on explicit user input indicating that the user is located in a vehicle, in a public vehicle, not in a vehicle, or the like. Pairs (F,L) may be used as a training datum for a classifier. The pair comprises one or more features (F) and the label (L). The label may be the determined label of Step 685. The features may be features that are extracted from the user interaction information. Additionally or alternatively, the features may include demographic features used to characterize the user. The training data may be used to train the classifier (Step 690). Based on the training data, the classifier may be able to predict a label L', based on features F'. In some exemplary embodiments, training data may be obtained and used only with connection to the mobile device. Additionally or alternatively, the training data from a plurality of mobile devices may be collected and used to train the classifier, such as a classifier in a server. In some exemplary embodiments, the determination of Step 620 of FIG. 6A may be based on a prediction by the classifier. In Step 620, features may be extracted from the user interaction information and potentially from additional sources such as indicative of demographic information of the user. The features may be fed to the classifier which may predict a label based on the features and its training.

Figure 7:
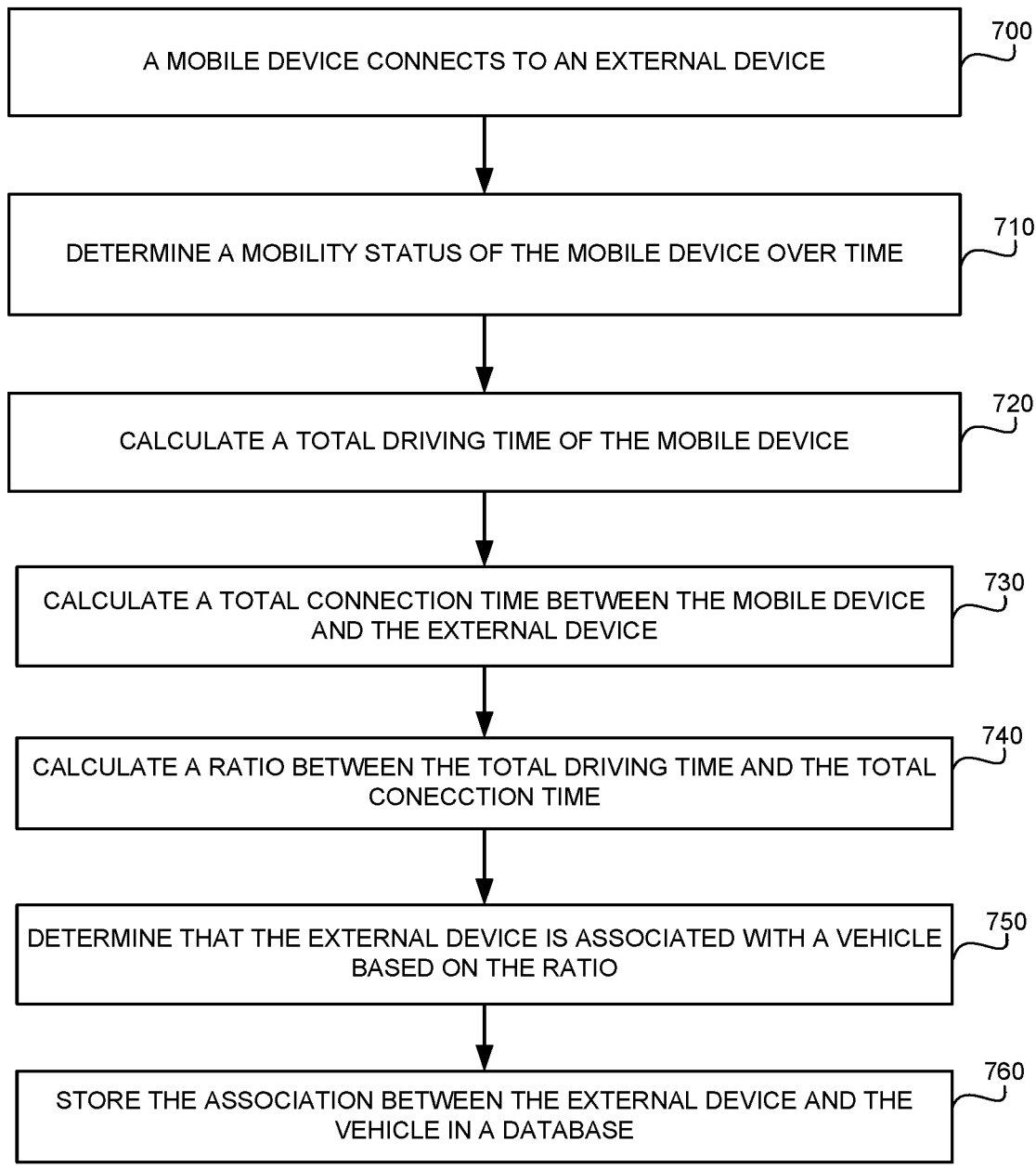
FIG. 7 shows a flowchart diagram of a method, in accordance with some exemplary embodiments of the disclosed subject matter.

Referring now to FIG. 7 showing a flowchart diagram of a method, in accordance with some exemplary embodiments of the disclosed subject matter. The method of FIG. 7 may be performed by a server, such as 130 of FIG. 1.

In Step 700, a mobile device may connect to an external device, in a similar manner to Step 200 of FIG. 2.

In Step 710, a mobility status of the mobile device may be determined. The mobility status may be determined periodically, every one second, every one minute, or the like. In some exemplary embodiments, the mobility status may be determined based on readings from a sensor, such as an accelerometer, over time. The curve defined by the readings may be indicative of the mobile device being held by a user that is walking, being mounted or placed in a vehicle that is being driven, or the like. In some exemplary embodiments, the mobility status may be either a "driving" mobility status or a "non-driving" mobility status. In some exemplary embodiments, in case the mobility status cannot be inferred at a particular time, the mobility status may be deemed "unknown".

In Step 730, a total connection time of the mobile device may be calculated. In some exemplary embodiments, the calculation may be based on information provided by the mobile device. As an example, the total connection time to a Wi-Fi hot spot may be 120 minutes, which may be a continuous connection or intermittent connections to the Wi-Fi hot spot.

In Step 720, a total driving time of the mobile device may be calculated. The total driving time may be computed based on the mobility statuses of Step 710 at each point in time. Referring to the example above, it may be determined that in 80 minutes, the mobile device was in a "driving" mobility status while connected to the Wi-Fi hot spot. The reminder of 40 minutes may be points in time in which the mobility status is different than "driving" mobility status, such as but not limited to "non-driving" mobility status, "unknown" mobility status, or the like.

In some exemplary embodiments, the total driving time and the total connection time may be computed based on information obtained from a plurality of mobile devices. By obtaining the information from a plurality of mobile devices, the information may be used to deduce more statistically sound conclusions.

In Step 740, a ratio between the total driving time and the total connection time may be calculated. Referring again to the example above, the calculated ratio may be 80/120=⅔.

In Step 750, an association between the external device and a vehicle may be determined. The association may be determined based on the ratio. In some exemplary embodiments, in case the ratio is above a predetermined threshold, such as 50%, 60%, 70%, or the like, the association may be determined. In some exemplary embodiments, in case it ratio is over 50% it may be indicative that most of the time the external device is inferred as having a "driving" mobility status, and therefore it may be determined that the external device is associated with a vehicle. It will be noted, however, that the threshold may be lower than 50%, such as 30%, as it may still be indicative of a substantial amount of time in which the external device was driven. In some exemplary embodiments, the association may be determined only in case the total driving time is larger than a predetermined threshold, such as 60 minutes, 200 minutes, or the like.

In Step 760, the association between the external device and the vehicle may be stored in a database, the association between the external device and the public vehicle may be stored in a database, such as in Step 240 of FIG. 2.

Figure 8:
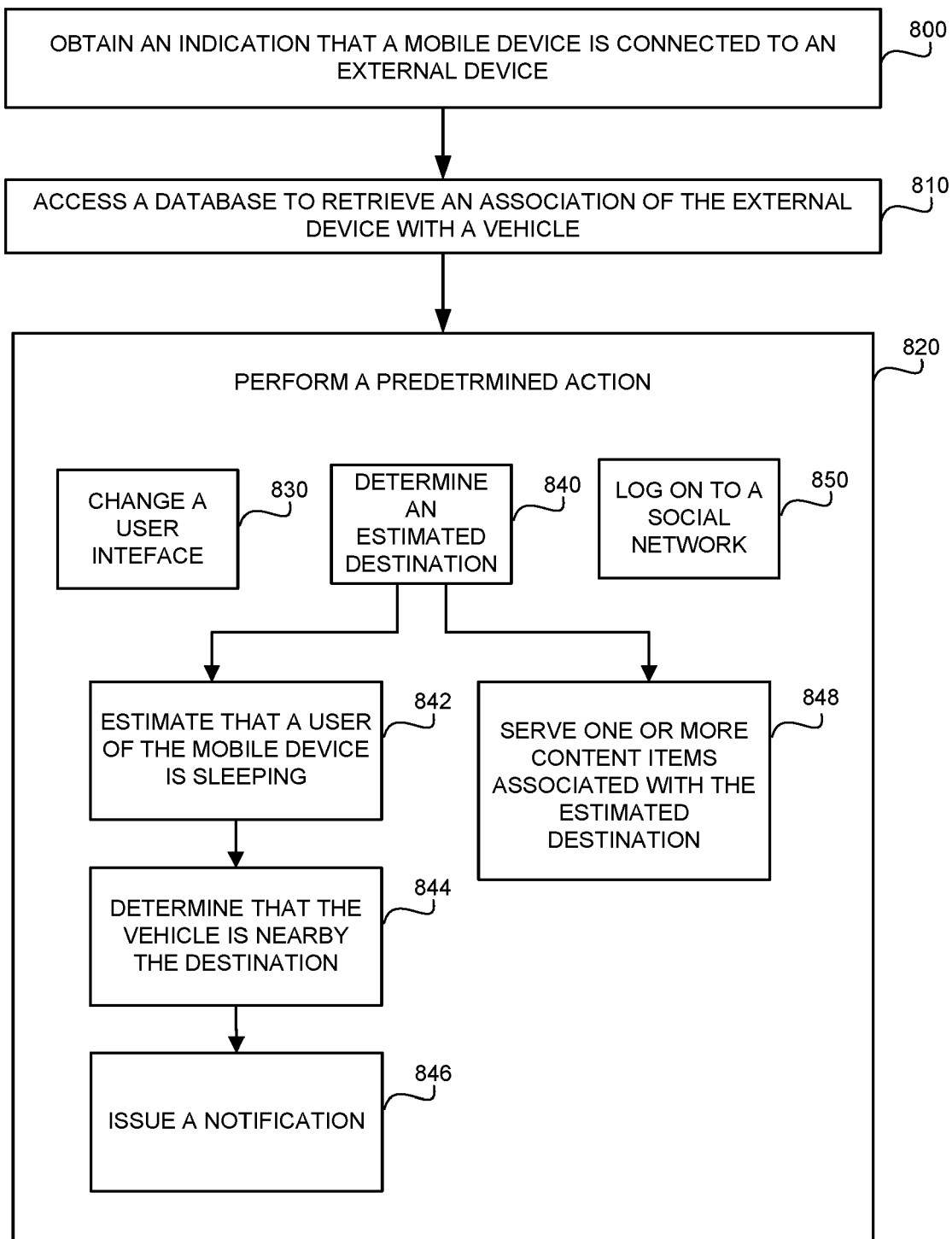
FIG. 8 shows a flowchart diagram of a method, in accordance with some exemplary embodiments of the disclosed subject matter.

Referring now to FIG. 8 showing a flowchart diagram of a method, in accordance with some exemplary embodiments of the disclosed subject matter. The method of FIG. 8 may be performed by a server, such as 130 of FIG. 1. Additionally or alternatively, the method of FIG. 8 may be performed by a mobile device, such as 110 of FIG. 1.

In Step 800, it may be determined that the mobile device is connected to an external device. In some exemplary embodiments, the determination may be performed by a mobile device. In some cases, the mobile device may act upon the determination. Additionally or alternatively, the mobile device may notify another component, such as a server, that the mobile device is connected to the external device.

In Step 810, a database, such as 140 of FIG. 1, may be accessed to retrieve a data record indication an association between the external device and a vehicle, which may or may not be a public vehicle. The association may be a predetermined association that may be manually provided. Additionally or alternatively, the association may be automatically determined in accordance with the disclosed subject matter.

In Step 820, a predetermined action may be performed. The predetermined action may be based on the vehicle that is determined to be associated with the external device. In some exemplary embodiments, the predetermined action may be an action that is configured to provide information relevant to the user based on the determination that the user is riding the vehicle. Additionally or alternatively, the predetermined action may be an action changing a functionality of the mobile device or invoking a functionality of the mobile device that is associated with the vehicle.

Examples of predetermined actions are provided in Steps 830, 848, 846, and 850.

In Step 830, a User Interface (UI) of the mobile device may be changed. As an example, the UI may be modified to a "bus" UI when the user is riding a bus. As another example, the UI of an application may be modified to a public vehicle UI. The public vehicle UI may have additional buttons not available in the original UI, may have less buttons than in the original UI, may have different buttons, or the like. In some exemplary embodiments, the new UI may be graphically designed to indicate its association with the vehicle. For example, a bus UI may be designed with a yellow color palette.

In Step 850, the mobile device may be logged on automatically to a predetermined social network platform. In some exemplary embodiments, a designated social network platform may be deployed to allow passengers of public vehicles to communicate with one another. Once the mobile device of the user is detected as being on a public vehicle, the mobile device may be logged in. In some exemplary embodiments, the social network platform may group and connect users riding a same type of public vehicle, a same public vehicle, or the like. The social network may be a local social network that is only accessible to mobile devices being located in the vehicle.

In Step 840, an estimated destination may be determined. The estimated destination may be determined based on the associated vehicle (e.g., a scheduled stop or destination of a public vehicle). In some exemplary embodiments, additional information may be used to estimate the destination, such as but not limited to user interaction information, positioning information, history of the user, or the like. In some exemplary embodiments, the estimation may be performed by a classifier that receives features, including an associated vehicle, and predicts a destination based on the features. An actual destination of the user may be determined in the future, and it may be used to determine whether or not the prediction was correct. Accordingly, the classifier may be updated to improve its operation in future predictions.

In Step 848, one or more content items may be served. The content items may be served by a server to the mobile device and presented to the user. Additionally or alternatively, the mobile device may serve the content items to the user. The content items may be associated with the estimated destination. A content item may be, for example, an advertisement that is associated with the estimated destination, such as an advertisement to a shop in the estimated destination. It will be noted that such advertisement may be served prior to the user arriving to the estimated destination and may be provided to the user at a time in which he has spare time and can consider the advertised service. As another example, the content item may be a news article associated with the estimated destination. As yet another example, the content item may be an information notification associated with the estimated destination, such as an Estimated Arrival Time (ETA) of the vehicle to the estimated destination, an estimated trip duration, a weather forecast for the estimated destination, or the like. In some exemplary embodiments, the content item may indicate delays, such as due to traffic jams, due to weather conditions, or due to other reasons, of the vehicle. For example, the content item may indicate that the train which the user is located on and which is planned to arrive to the estimated destination at 09:20 AM is delayed and its ETA is 09:32 AM instead.

In Step 842, it may be estimated that the user of the mobile device is sleeping. The estimation may be based on user interaction information (or lack thereof), readings of sensors of the mobile device, or the like. For example, an accelerometer may be used to identify how the mobile device is being held. Based on the accelerometer readings, it may be estimated that the user is sleeping. In some exemplary embodiments, the estimation may be performed by a classifier. Additionally or alternatively, the user may explicitly indicate that he is going to sleep.

In Step 844, the vehicle is determined to be nearby the destination. The determination may be that the vehicle is within a predetermined range from the destination, such as 2 km. Additionally or alternatively, the vehicle may be determined to be nearby the destination if the ETA is below a threshold, such as 30 seconds, 2 minutes, or the like. The threshold may be determined automatically, set as a parameter of the system, manually set by the user, or the like.

In Step 846, a notification may be issued. The notification may be accompanied by a cue that is intended to wake up the user, such as an audible sound, moderate vibrations, or the like.

Figure 9:
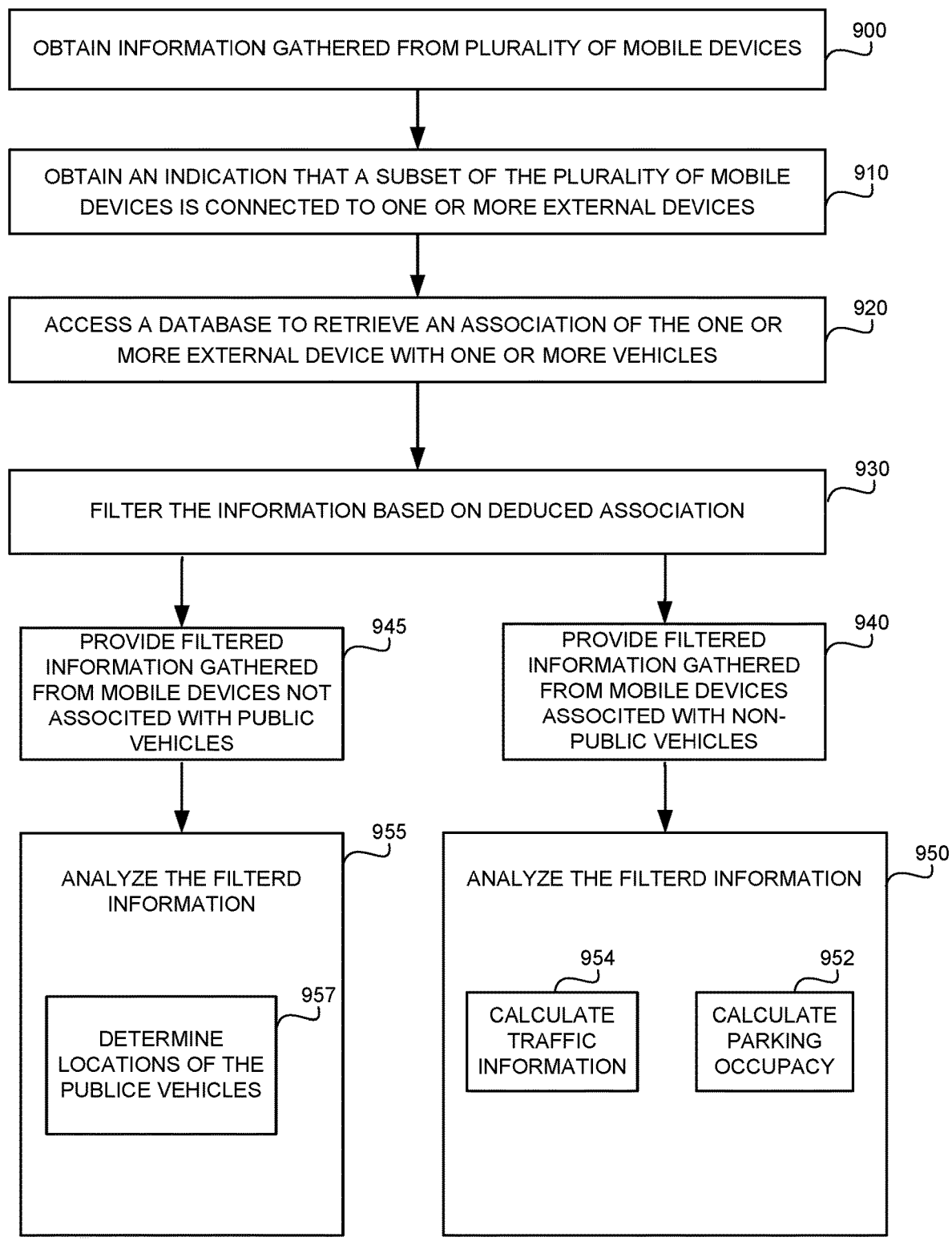
FIG. 9 shows a flowchart diagram of a method, in accordance with some exemplary embodiments of the disclosed subject matter.

Referring now to FIG. 9 showing a flowchart diagram of a method, in accordance with some exemplary embodiments of the disclosed subject matter. The method of FIG. 9 may be performed by a server, such as 130 of FIG. 1.

In Step 900, the server may obtain information gathered from a plurality of mobile devices. The information may be crowd sourced from the mobile devices. In some exemplary embodiments, the mobile devices may execute an application that is configured to transmit the information to the server.

In Step 910, the server may determine that a subset of the mobile devices was connected to external devices while the information was transmitted. For example, mobile device A may have been connected to external device X when sending some of the information of Step 900, mobile device B may have been connected to external device X as well, mobile device C may have been connected to external device D and mobile device D may have not been connected to any external device.

In Step 920, the information concerning the connected external devices may be used to deduce associated vehicle to each mobile device. A database, such as 140 of FIG. 1, may be accessed to retrieve the association of each external device to a vehicle. Based on the association, it may be determined for each mobile device if it was located on a vehicle while transmitting the information, which type of vehicle, which vehicle, or the like.

In Step 930, the information of Step 900 may be filtered based on a criteria relating to the mobile devices being on vehicles. In some cases, information transmitted while devices are located on vehicles may be filtered out (e.g., dropped), while in other cases, information transmitted while devices are located on vehicles may be filtered in (e.g., retained while dropping all other information). In some exemplary embodiments, the filtering may be associated with public vehicles, with specific type of vehicles, with specific vehicles, or the like.

Steps 940-950 exemplify one usage for the filtered information, while Steps 945-955 exemplify another usage.

The filtered information may include only information gathered from mobile devices that are on non-public vehicles (940). The filtered information may be analyzed (950). As an example, traffic information may be calculated based on the filtered information (954). Such filtering criteria may assist in avoiding receiving and being affected by contradicting information of vehicles that are not affected by traffic in a same manner as a private vehicle (e.g., busses in bus lanes, trains, or the like). As another example, parking occupancy may be calculated (952). Parking occupancy may be computed based on crowd sourced information. However, information of public vehicles may be desired to be filtered out. For example, a bus stopping at a bus stop may be accidently treating as a parking instance. By filtering out such information, such false positive parking instances may be avoided.

The filtered information may include only information gathered from mobile devices that are on public vehicles (945). The filtered information may be analyzed (955) for some desired purpose. As an example, locations of public vehicles may be monitored in real time based on crowd sourced data (957). The locations of the public vehicles may be determined without a need to a priori deploy designated positioning devices for each public vehicle and without the consent or assistance of the service provider of the public vehicle.

In some exemplary embodiments, by determining automatically a vehicle (or type thereof) in which the user is located, other properties of the user may be estimated. In some exemplary embodiments, age, gender, ethnicity, or other socio-economical properties of the user may be deduced. Additionally or alternatively, the properties of the user may be determined from many factures such as analyzing apps installed in their devices, analyzing the apps in use, analyzing to movement of the user (e.g. running, walking), identifying places the user goes to—such as school, university etc. In addition analysis of speech/voice/pitch of a person, the way and speed he activates the device may help to determine these properties. In some exemplary embodiments, training data set may be obtained based on users whose properties are unknown or inferred. For each such user, when the user is determined to be in a vehicle (or type thereof), a training data record may be generated. The training data may be provided to a classifier or other machine learning tool that is adapted to predict the properties for other users based on the vehicle in which they are located. In some exemplary embodiments, located in vehicles over time (e.g., 10 minutes in a subway, twenty minutes in a car, 15 minutes in a subway) may be used as a pattern of vehicle usage, In some exemplary embodiments, the pattern of vehicle usage may be usage over a timeframe, such as a week, a month, a year. The pattern of vehicle usage may be used to predict one or more properties regarding the user with or without additional information available.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining information from a plurality of mobile devices, wherein the information is gathered by sensors of the plurality of mobile devices, while the plurality of mobile devices are connected to an external device; and automatically determining, based on the information, that the external device is uniquely and persistently associated with a vehicle, wherein said automatically determining is performed by a processor, wherein said automatically determining is performed without prior knowledge about the external device being related to the vehicle;

whereby enabling a mobile device to automatically determine that the mobile device is located on the vehicle, based on the mobile device being connected to the external device and based on the association between the external device and the vehicle.

2. The method of claim 1 further comprises:

storing the association between the external device and the vehicle in a database, wherein the database is accessible to the mobile device; and wherein the mobile device is configured to access the database to determine that the mobile device is located on the vehicle, based on the mobile device being connected to the external device.

3. The method of claim 1, wherein the information comprises a first physical datum gathered by a first mobile device while the first mobile device is connected to the external device and a second physical datum gathered by a second mobile device while the second mobile device is connected to the external device;

wherein said determining comprises identifying a correlation over time between the first physical datum and the second physical datum.

4. The method of claim 3, wherein, for each point in time, the first and second physical datum comprise at least one of:

a location of a mobile device at a point in time;
a speed of a mobile device at a point in time;
a direction of a mobile device at a point in time;
an acceleration of a mobile device at a point in time;
an altitude of a mobile device at a point in time;
a light measurement measured by a mobile device at a point in time; and
a sound measurement measured by a mobile device at a point in time.

5. The method of claim 1, wherein the information comprises a positional data of one mobile device of the plurality of mobile devices in various points in time;

wherein said determining comprises identifying a correlation over time between the positional data of the one mobile device and a path of the vehicle, wherein the path is obtained from a database.

6. The method of claim 1, wherein the information comprises a speed of one mobile device of the plurality of mobile devices in at least one point in time;

wherein said determining comprises determining that the speed of the one mobile device is greater than a predefined speed threshold;

wherein the predefined speed threshold is associated with a speed of the vehicle.

7. The method of claim 1, wherein the information comprises positional data of one mobile device of the plurality of mobile devices in various points in time;

wherein said determining comprises determining a movement pattern on the positional data in the various points in time;

wherein the movement pattern is associated with the mobile device being located in or on the vehicle.

8. The method of claim 1, wherein the information is indicative of a position and speed of one mobile device of the plurality of mobile devices in various points in time;

wherein said method further comprises: obtaining traffic information pertaining to the position of the one mobile device in the various points in time;

wherein said determining comprises identifying a contradiction between the traffic information and the speed of the one mobile device.

9. The method of claim 1, wherein the information comprises user interaction information indicating interactions by a user of one mobile device with the one mobile device;

wherein said determining comprises identifying that the user interaction information is indicative of the user being on or in the vehicle.

10. The method of claim 9, wherein said identifying that the user interaction is indicative of the user being on or in the vehicle comprises utilizing a classifier, wherein the classifier is trained by training data.

11. A computerized apparatus having a processor, the processor configured to perform the steps of:

obtaining information from a plurality of mobile devices, wherein the information is gathered by sensors of the plurality of mobile devices, while the plurality of the mobile devices are connected to an external device; and automatically determining, based on the information, that the external device is uniquely and persistently associated with a vehicle, wherein said automatically determining is performed without prior knowledge about the external device being related to the vehicle;

whereby enabling a mobile device to automatically determine that the mobile device is located on the vehicle, based on the mobile device being connected to the external device and based on the association between the external device and the vehicle.

12. A computer program product comprising a computer readable storage medium retaining program instructions, which program instructions when read by a processor, cause the processor to perform a method comprising:

obtaining information from a plurality of mobile devices, wherein the information is gathered by sensors of the plurality of mobile devices, while the plurality of the mobile devices are connected to an external device; and automatically determining, based on the information, that the external device is uniquely and persistently associated with a vehicle, wherein said automatically determining is performed without prior knowledge about the external device being related to the vehicle;

whereby enabling a mobile device to automatically determine that the mobile device is located on the vehicle, based on the mobile device being connected to the external device and based on the association between the external device and the vehicle.

* * * * *